US012145392B2

(12) United States Patent
Gilman et al.

(10) Patent No.: US 12,145,392 B2

(45) Date of Patent: Nov. 19, 2024

(54) METHODS AND SYSTEMS FOR STENCIL PRINTING

(71) Applicant: 3M INNOVATIVE PROPERTIES COMPANY, St. Paul, MN (US)

(72) Inventors: Ann M. Gilman, Bayport, MN (US); Kevin T. Reddy, Minneapolis, MN (US); Shawn C. Dodds, St. Paul, MN (US); Matthew R. D. Smith, Woodbury, MN (US); Clinton J. Cook, Woodbury, MN (US); Mikhail L. Pekurovsky, Bloomington, MN (US); Matthew S. Stay, Bloomington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/258,700

(22) PCT Filed: Dec. 21, 2021

(86) PCT No.: PCT/IB2021/062111

§ 371 (c)(1),
(2) Date: Jun. 21, 2023

(87) PCT Pub. No.: WO2022/144694

PCT Pub. Date: Jul. 7, 2022

(65) Prior Publication Data

US 2024/0034088 A1 Feb. 1, 2024

Related U.S. Application Data

(60) Provisional application No. 63/131,711, filed on Dec. 29, 2020.

(51) Int. Cl.
*B41M 7/00* (2006.01)
*B41M 1/12* (2006.01)

(52) U.S. Cl.
CPC .............. *B41M 7/009* (2013.01); *B41M 1/12* (2013.01)

(58) Field of Classification Search
CPC ...... B41M 7/009; B41M 1/12; B41M 7/0081; B41M 3/006; B41L 13/00; B41L 13/14
See application file for complete search history.

(56) References Cited

U.S. PATENT DOCUMENTS

| | | | | |
|---|---|---|---|---|
| 2,691,343 A * | 10/1954 | Huebner | B41M 1/125 | 250/326 |
| 8,915,183 B2 | 12/2014 | Becker et al. | | |
| 2019/0030938 A1 | 1/2019 | Vandre et al. | | |

FOREIGN PATENT DOCUMENTS

| | | |
|---|---|---|
| CA | 2003949 C | 8/1994 |
| CN | 203427433 U | 2/2014 |

(Continued)

OTHER PUBLICATIONS

International Search report for PCT International Application No. PCT/IB2021/062111, mailed on Apr. 4, 2022, 5 pages.

*Primary Examiner* — Christopher E Mahoney
*Assistant Examiner* — Marissa Ferguson-Samreth
(74) *Attorney, Agent, or Firm* — Thomas M. Spielbauer

(57) ABSTRACT

Methods and apparatuses for screen or stencil printing a pattern on a substrate are provided. The substrate (2) has its major surface in contact with a first major surface (112) of a stencil shell (111) having apertures (116). A coating material is disposed onto the second major surface (114) of the stencil shell (111) to flow through the apertures (116) to contact the substrate (2), where the coating material is at least partially cured. The substrate (2) is separated (C) from the first major surface (112) of the stencil shell (111) after the curing (142) and a pattern (42) of the at-least-partially-cured coating material is formed on the substrate (2).

14 Claims, 8 Drawing Sheets

(56) References Cited

FOREIGN PATENT DOCUMENTS

| | | | | |
|---|---|---|---|---|
| CN | 105572773 | B | | 12/2017 |
| DE | 202009012063 | U1 | | 12/2009 |
| DE | 102012209371 | A1 | | 12/2013 |
| DE | 102015219964 | A1 | * | 4/2017 |
| GB | 2481079 | B | | 6/2014 |
| JP | 11277864 | A | * | 10/1999 |
| JP | H11-277864 | A | | 10/1999 |

* cited by examiner

METHODS AND SYSTEMS FOR STENCIL PRINTING

CROSS REFERENCE TO RELATED APPLICATIONS

This application is a national stage filing under 35 U.S.C. 371 of PCT/IB2021/062111, filed 21 Dec. 2021, which claims the benefit of US Application No. 63/131,711, filed 29 Dec. 2020, the disclosure of which is incorporated by reference in its/their entirety herein.

BACKGROUND

A variety of printing technologies have been used to create patterned coatings on substrates, including flexographic printing, gravure printing, inkjet printing, screen or stencil printing, etc. Screen or stencil printing has been widely used for creating patterns with taller features (e.g., 15 to 20 micrometers).

SUMMARY

Briefly, in one aspect, the disclosure describes a method of applying a pattern to a substrate. The method includes providing a stencil comprising a stencil shell having a first major surface and a second major surface opposite the first major surface, the stencil shell including one or more apertures extending from the first major surface to the second major surface, the stencil being a rotary stencil or a flatbed stencil. The method further includes contacting a major surface of a substrate with the first major surface of the stencil; disposing a coating material onto the second major surface of the stencil shell to allow at least some of the coating material to fill in the one or more apertures and contact the major surface of the substrate; at least partially curing the coating material in contact to the major surface of the substrate at a curing zone where the major surface of the substrate is in contact with the first major surface of the stencil shell; and after at least partially curing the coating material, separating the major surface of the substrate from the first major surface of the stencil shell. A pattern of the coating material that is at least partially cured is formed on the major surface of the substrate.

In another aspect, this disclosure describes a stencil printing system including a stencil comprising a stencil shell having a first major surface and a second major surface opposite the first major surface, the stencil shell including one or more apertures extending from the first major surface to the second major surface, the stencil being a rotary stencil or a flatbed stencil; a substrate including a major surface in contact with the first major surface of the stencil shell; an applicator disposed adjacent to the second major surface of the stencil, configured to dispose a coating material onto the second major surface of the stencil shell to allow at least some of the coating material to fill in the one or more apertures and contact the major surface of the substrate; a curing mechanism configured to at least partially curing the coating material in contact to the major surface of the substrate at a curing zone where the major surface of the substrate is in contact with the first major surface of the stencil shell; and a separation mechanism positioned downstream of the curing mechanism, configured to separate the major surface of the substrate from the first major surface of the stencil shell after the coating material is at least partially cured by the curing mechanism, wherein a pattern of the coating material that is at least partially cured is formed on the major surface of the substrate.

Various unexpected results and advantages are obtained in exemplary embodiments of the disclosure. One such advantage of exemplary embodiments of the present disclosure is to allow printing of low viscosity materials with improved feature topology control. Typically, for stencil-printing materials having a low viscosity (e.g., less than 2000 cP), it can be challenging to not get messy edged or fully merged features, particularly for larger features (e.g., greater than 1 mm). Embodiments of this disclosure allow the coating materials to be cured in place, eliminating opportunity for it to spread in width after a film split. Additionally, it would be very challenging to print a tall feature with lower viscosity materials. Embodiments of this disclosure allow to set the feature thickness by the thickness of a stencil or a stencil plus a gasket. Embodiments of this disclosure provide improved feature topology control. Feature topology is high dictated by material rheology and process conditions, so domed or rounded top features are common for printing features such as circles. Cure in place allows a straighter, flatter topped feature which are useful for many applications including adhesives. Embodiments of this disclosure also allow printing of elastic materials on a substrate. Typically, materials that are highly elastic (e.g., adhesives) may not be printed well because during the film split between a stencil and a substrate, the materials do not cleanly separate and form threads or strings as defects. By curing the elastic material prior to the film split, we remove the film split with the material in an un-cured or liquid state.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying drawings, in which:

FIG. 1 is a schematic diagram of a rotary screen-printing system, according to one embodiment of this disclosure.

Figure 1:
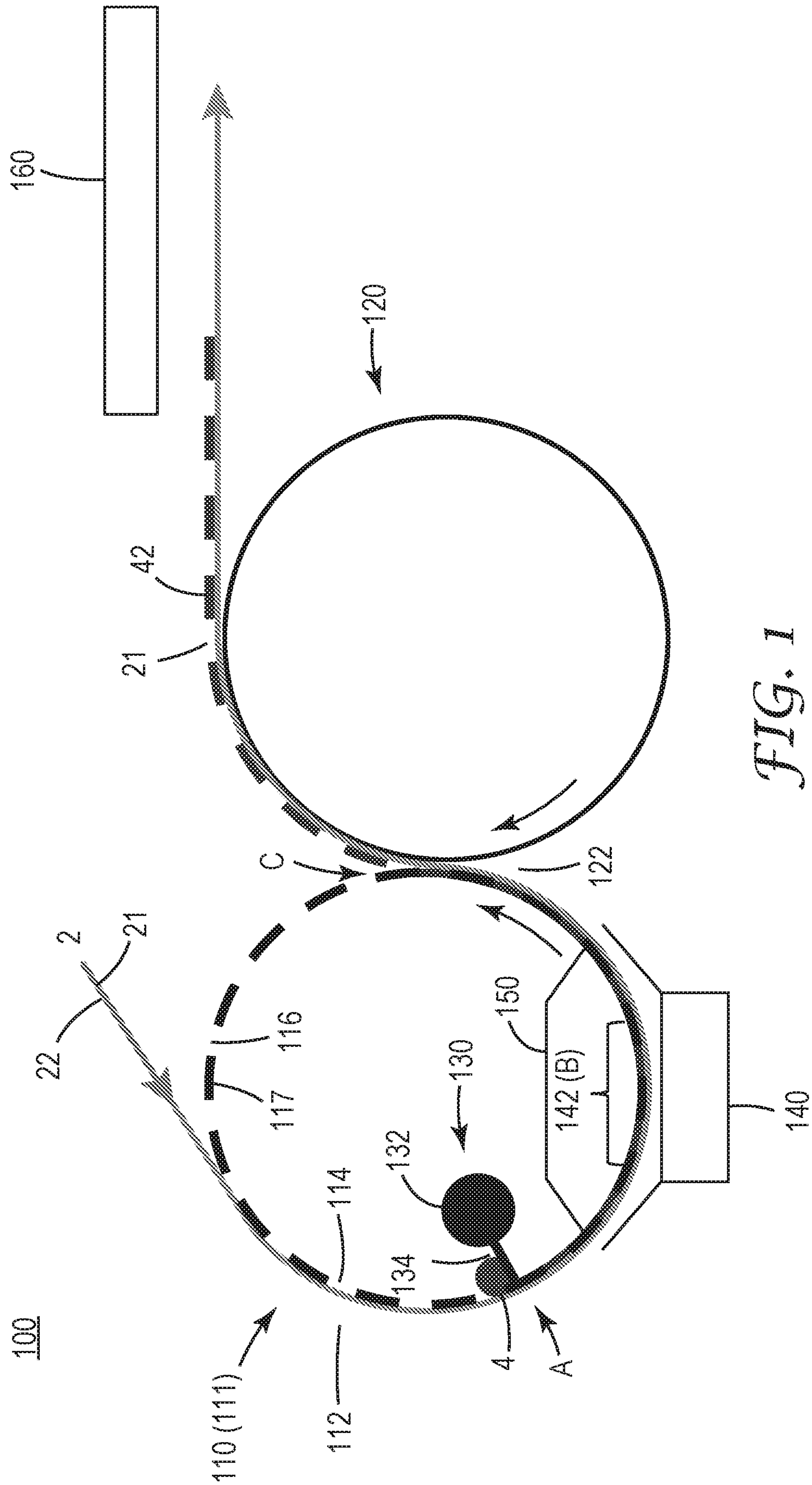
FIG. 1' is a schematic diagram of a standard rotary screen-printing system.
Figure 1:
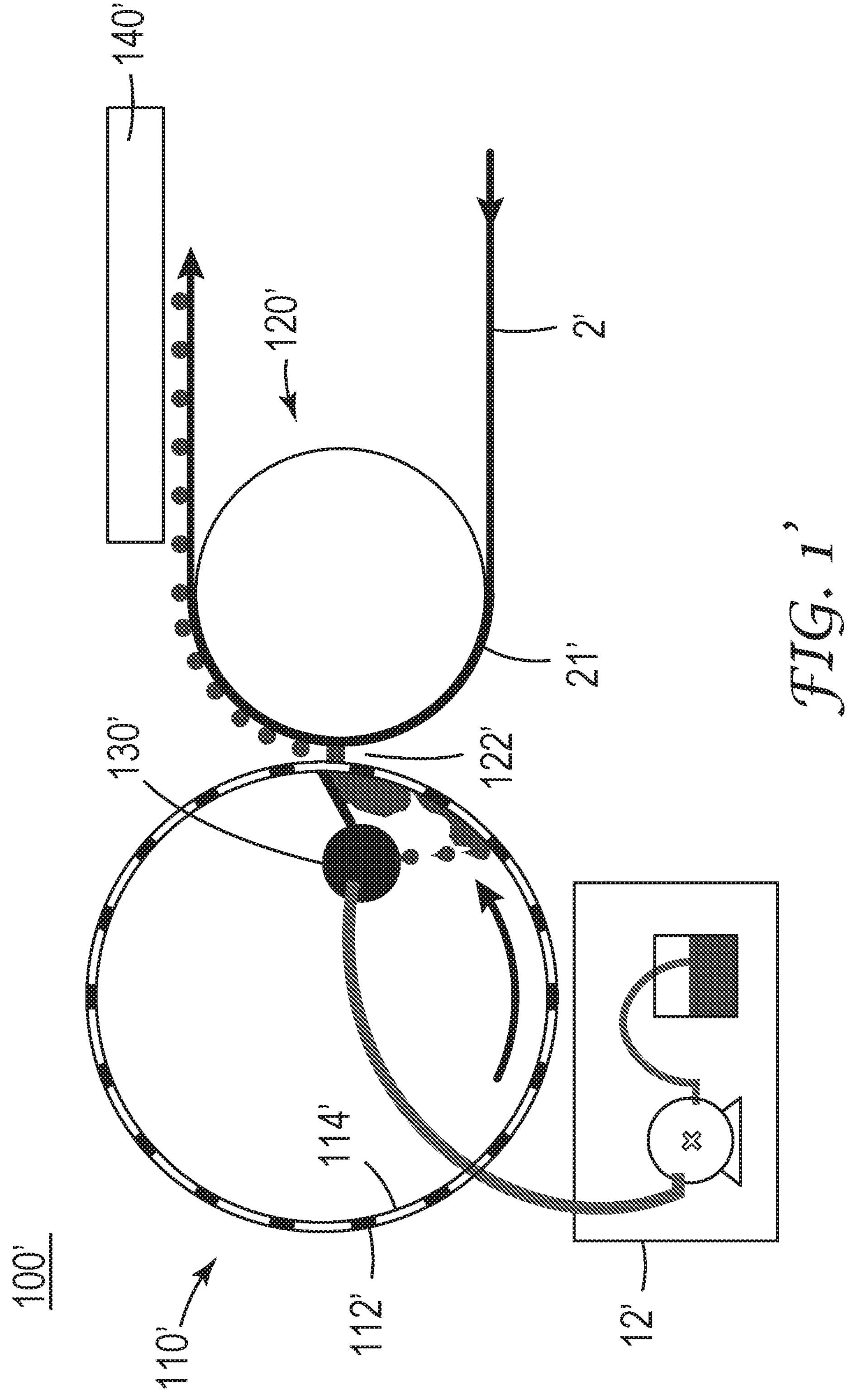

In the drawings, like reference numerals indicate like elements. While the above-identified drawings, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

In this application, the term "screen or stencil printing" refers to a printing process that uses an applicator (e.g., a blading device) to force ink through openings or apertures in a patterned mesh screen or stencil onto a substrate.

The term "screen," "stencil," "galvano," or "galvano screen" refers to a continuous mesh that is selectively blocked in areas that are not to be printed by a coated emulsion and include open areas that allow ink to penetrate through, or a continuous sheet, commonly stainless steel or nickel, that only has openings in the desired printing region (s) that allow ink to penetrate through.

The terms "liquid," "liquid material," or "liquid coating material" refers to any materials flowable at coating operation conditions described herein.

In this application, the terms "polymer" or "polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

In this application, by using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate (e.g., web). However, unless otherwise indicated, it is not intended that the substrate (e.g., web) or articles should have any particular orientation in space during or after manufacture.

In this application, by using the term "overcoated" to describe the position of a layer with respect to a substrate (e.g., web) or other element of an article of the present disclosure, we refer to the layer as being atop the substrate (e.g., web) or other element, but not necessarily contiguous to either the substrate (e.g., web) or the other element.

In this application, the term "machine direction" refers to the direction in which the substrate or web travels. Similarly, the term "cross-web direction" refers to the direction perpendicular to the machine direction (i.e., substantially perpendicular to the direction of travel for the web), and in the plane of the top surface of the web.

In this application, the terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

In this application, the term "substantially" with reference to a property or characteristic means that the property or characteristic is exhibited to a greater extent than the opposite of that property or characteristic is exhibited. For example, a substrate (e.g., web) that is "substantially" transparent refers to a substrate (e.g., web) that transmits more radiation (e.g. visible light) than it fails to transmit (e.g. absorbs and reflects). Thus, a substrate (e.g., web) that transmits more than 50% of the visible light incident upon its surface is substantially transparent, but a substrate (e.g., web) that transmits 50% or less of the visible light incident upon its surface is not substantially transparent.

In this application, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this application, the recitation of numerical ranges by endpoints includes all numbers subsumed within that range (e.g. 1 to 5 includes 1, 1.5, 2, 2.75, 3, 3.8, 4, and 5).

FIG. 1' is a schematic diagram of a standard rotary screen-printing system 100'. The illustrated system is used to print a pattern of coating material onto a moving substrate 2'. A hollow, rotating stencil roll 110' is provide to rotate about an axis of rotation. The stencil roll 110' has a major radially outer surface 112', a major radially inner surface 114', and through-apertures or openings extending from the major radially outer surface 112' to the major radially inner surface 114'. The coating material (e.g., an ink) is delivered from a material source 12' to an applicator 130' inside the hollow, rotating stencil roll 110'. The stencil roll 110' engages with an impression roll 120' to form a nip 122'. The substrate 2' enters the nip 122' and wraps around the impression roll 120'. The applicator 130' is positioned adjacent to the nip 122' to press against the inner surface 114' of the stencil roll 110' such that the coating material is squeezed to pass through the apertures of the stencil roll 110' and contacts to the major surface 21' of the substrate 2' to form a pattern on the substrate 2'. After the substrate 2' exits the nip 122', a curing mechanism 140' is provided to completely cure the pattern of coating material on the major surface 21' of the substrate 2'.

The standard rotary screen-printing process such as shown in FIG. 1' may have some technical limitations. For example, it may be limited to printing inks with certain rheological properties. It may require the coating material having a relatively high viscosity, for example, at least a few thousand centipoise (cP) at zero shear. For printing inks with a relatively low viscosity, the standard rotary screen-printing process may also have a limited coating thickness. For example, when low-viscosity inks are printed onto a substrate to produce thin features, the printed pattern is generally less than 100 to 200 micrometers in thickness. To achieve features with greater thickness without merging, higher viscosity inks are generally required, ranging in the hundreds of thousands to millions of centipoise (cP) at zero shear. In addition, the required screen printing inks may not have any appreciable elasticity, because such elasticity can produce printing defects such as stringing, mottling, or bubbling. Although some inks can be reformulated to meet the above requirements, reformulation may be very challenging or not feasible for some materials, for example, for adhesives which are formulated to achieve specific material properties.

Methods and apparatuses are described herein for screen or stencil printing methods and systems which can address the above described issues. The methods and systems described herein can achieve feature heights similar or greater to those produced in the standard screen printing process. In some embodiments, this can be achieved by placing the substrate in intimate contact with a first major surface of the screen or stencil while a blading process and a curing process are conducted to form a printed pattern which is at least partially cured. In other words, the printed pattern is at least partially cured in place. This allows the substrate with the printed pattern to be separated from the screen or stencil. Some embodiments of the present disclosure further provide a second curing process for further curing the pattern of the at-least-partially-cured coating material after the separating of the substrate from the first major surface of the screen or stencil.

Figure 2:
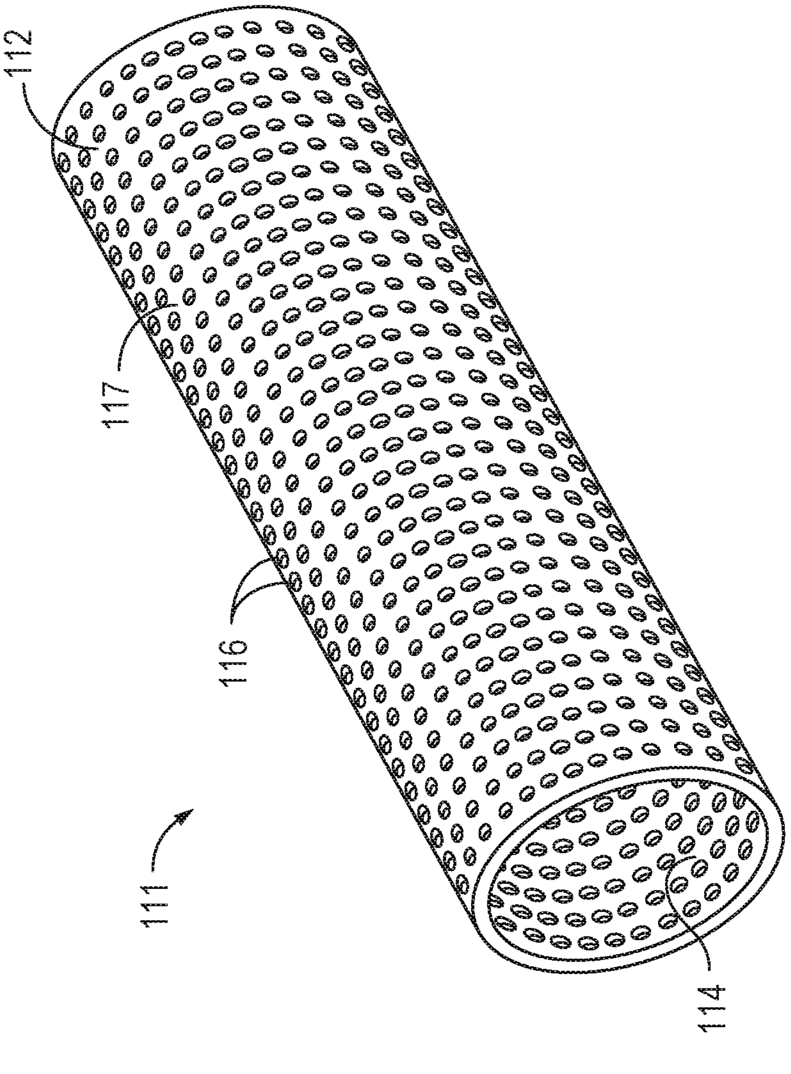
FIG. 2 is a side perspective view of an exemplary stencil shell of a stencil roll, according to one embodiment of this disclosure.

Various exemplary embodiments of the disclosure will now be described with particular reference to the Drawings. Referring to FIG. 1, a schematic diagram of a "cure-in-place" rotary screen-printing apparatus or system 100 is provided, according to one embodiment. The system 100 includes a stencil roll 110 including a stencil shell or screen 111 having a major radially outer surface 112 and a major radially inner surface 114 opposite the outer surface 112. FIG. 2 is a side perspective view of the stencil shell or screen 111 of the stencil roll 110. The stencil shell or screen 111 includes one or more through-apertures 116 extending from the outer surface 112 to the inner surface 114. Land areas 117 are interspersed between the apertures 116. The stencil shell may include one or more selected regions of the apertures to form a pattern which is configured to allow the coating material to flow therethrough. The apertures of the stencil shell may have a thickness, for example, about 50 micrometers to about 1.0 mm. When a gasket (e.g., a gasket shown in FIGS. 3A-C) is added, the stencil shell may have a greater thickness. The apertures of the stencil shell may have a lateral dimension, for example, about 100 micrometers to about 5.0 mm.

A substrate 2 at least partially wraps around the stencil roll 110, with a first major surface 21 of the substrate 2 contacting to the outer surface 112 of the stencil roll 110. The substrate 2 can include any suitable flexible substrate, such as, for example, a polymer web, a paper, a polymer-coated paper, a release liner, an adhesive coated web, a metal coated web, a flexible glass or ceramic web, a nonwoven, a fabric, or any combinations thereof. The substrate 2 is delivered to wrap the stencil roll 110 with various wrap angles.

A coating material is delivered to an applicator 130 inside the stencil roll 110 adjacent to the inner surface 114 of the stencil shell or screen 111. The applicator 130 guides the coating material onto the inner surface 114 to allow at least some of the coating material to fill in the apertures 116 of the stencil shell or screen 111 and contact the first major surface 21 of the substrate 2. The applicator 130 may include at least one of a squeegee blade, a doctor blade, a die, a rod, or a roll. In the embodiment depicted in FIG. 1, the applicator 130 includes a squeegee blade. The coating material is fed into the inside of the stencil roll 110 across the length of the squeegee blade. The squeegee blade is positioned to blade the coating material to flow through the apertures 116 of the stencil shell or screen 111. A liquid layer 4 (i.e., a coating bead including, e.g., a rolling bank) of the coating material is formed at a location A of the stencil shell or screen 111 when the squeegee blade engages with the inner surface 114 of the screen 111. The squeegee blade is positioned with respect to the inner surface 114 such that the coating material can be bladed substantially cleanly on the inner surface 114 at the land areas 117 of the screen to prevent curing of excess coating material that is not in contact with the first major surface 21 of the substrate 2. The squeegee blade includes a bar 132 that is supported on either end that has the squeegee 134 bolted to it. The bar 132 is the mechanical support for the squeegee 134 to help prevent bending and can also be hollow to allow for fluid delivery to the middle of the screen. The squeegee 134 can clean the land area on the inside of the screen/stencil. It is pressed into the screen/stencil pushing material through the openings and wiping the surface of the inside of the screen/stencil. The squeegee 134 can also be made an elastic material or have an elastic tip to better seal against the inside of the screen/stencil providing better wiping.

The coating material can include curable inks having a wide range of viscosity, for example, a viscosity less than about 20,000 centipoise (cP) at zero shear. Embodiments in the present disclosure do not require the coating material having a relatively high viscosity, for example, at least a few thousand centipoise (cP) at zero shear. For printing inks with a relatively low viscosity, embodiments in the present disclosure can provide higher coating thicknesses compared to the standard rotary screen-printing process may also have a limited coating thickness.

Downstream of the coating bead 4, a first curing mechanism 140 is provided to at least partially cure the coating material filling in the apertures 116 and in contact to the first major surface 21 of the substrate 2 at a curing zone 142, where the first major surface 21 of the substrate 2 is in contact with the outer surface 112 of the stencil shell or screen 111. The curing zone 142 may have an angular span of various degrees. The location of the curing zone 142 is designated as the location "B" of the stencil shell or screen 111. The location A of the coating bead 4 of the coating material is upstream of the location B of the curing zone 142.

A shield structure 150 is provided adjacent to the inner surface 114 and facing the curing zone 142. The shield structure 150 is positioned to shield the coating bead 4 from any radiation from the first curing mechanism 140. The shield structure 150 can be made of any suitable material opaque or insulative to the radiation from the first curing mechanism 140. For example, when the first curing mechanism 140 provides ultraviolet (UV) light to cure the coating material, the shield structure 150 can be substantially opaque to block the UV light from reaching and curing the coating bead 4. When the first curing mechanism 140 provides thermal radiation to cure the coating material, the shield structure 150 can be substantially thermally insulative to block the thermal radiation from reaching and curing the coating bead 4. In some embodiments, the squeegee blade itself may be made of a material (e.g., metal) capable of shielding the coating bead 4 from the radiation from the first curing mechanism 140.

Figure 1C:
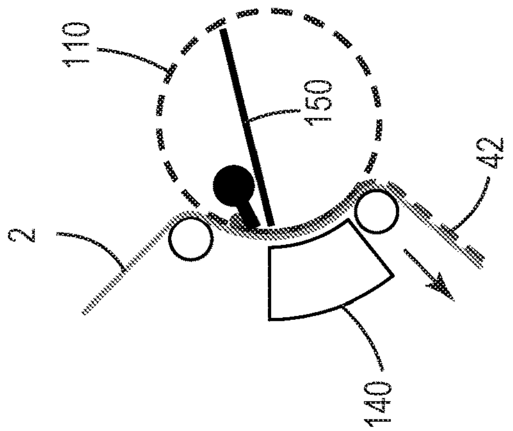
FIG. 1C is a schematic diagram of a rotary screen-printing system, according to another embodiment of this disclosure.
Figure 1B:
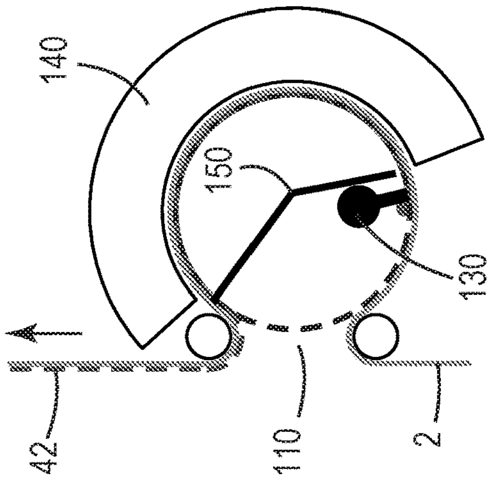
FIG. 1B is a schematic diagram of a rotary screen-printing system, according to another embodiment of this disclosure.
Figure 1A:
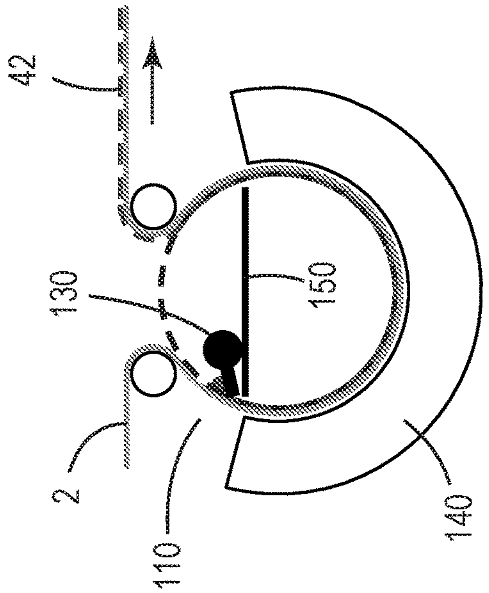
FIG. 1A is a schematic diagram of a rotary screen-printing system, according to another embodiment of this disclosure.

It is to be understood that the applicator 130, the first curing mechanism 140, and the shield structure 150 can have various configurations and relative locations. FIGS. 1A-C illustrate various embodiments of a rotary screen-printing system including the applicator 130, the first curing mechanism 140, and the shield structure 150 disposed adjacent the stencil roll 110. One or more rollers are provided to convey the substrate 2 such that the substrate 2 at least partially wraps the stencil roll 110 with various wrap angles up to 360 degrees. The curing zone provided by the first curing mechanism 140 has various angular spans as desired. The applicator 130 is positioned upstream of the curing zone. The shield structure 150 has various configurations configured to shielding the coating bead provided by the applicator 130 from a substantial radiation from the first curing mechanism 140.

In some embodiments, the coating material filling in the apertures 116 and in contact to the first major surface 21 of the substrate 2 at the curing zone 142 is at least partially cured, dried or solidified to an extent such that the coating material is cured or solidified to attach to the substrate and can be pull out of the stencil when separated.

Curing can be accomplished by, for example, exposure of the coating to elevated temperature, or actinic radiation. Actinic radiation can be, for example, in the UV spectrum. After the drying, curing, or solidification, the coating thickness can be reduced. That reduction of coating thickness is due to a loss of volatile materials during drying, and/or shrinkage of the polymer.

While a rotary stencil is illustrated in the embodiment of FIG. 1, it is to be understood that the stencil can be a flatbed stencil. The coating methods and apparatuses described herein can be applied to flatbed screen printing where one or more flat stencils or rotary stencils can be used. The "inside" or "inner surface" of a stencil refers to the side of the stencil where the coating material is applied, and the "outside" or "outer surface" of the stencil refers to the side of the stencil that contacts the substrate. For a flatbed stencil printing, the entire flatbed stencil can be in contact with the substrate where the coating material (e.g., ink) can be bladed into the openings, and the coating material can be at least partially cured with the construction/stack together, and then the substrate is peeled away from the flatbed stencil.

Figure 3A:
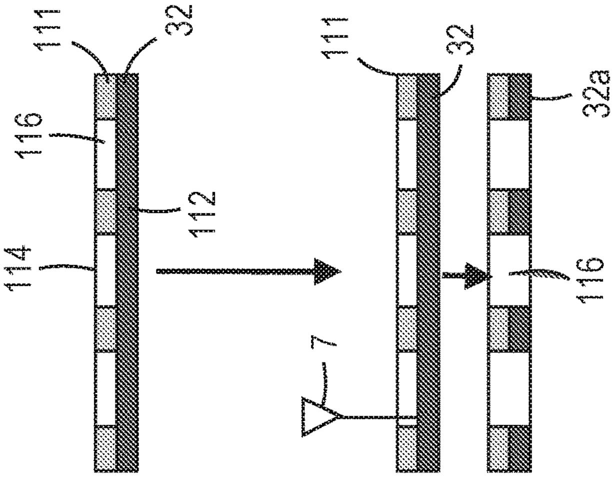
FIG. 3A is a schematic diagram of a process to forming a gasket on a stencil, according to one embodiment of this disclosure.
Figure 3B:
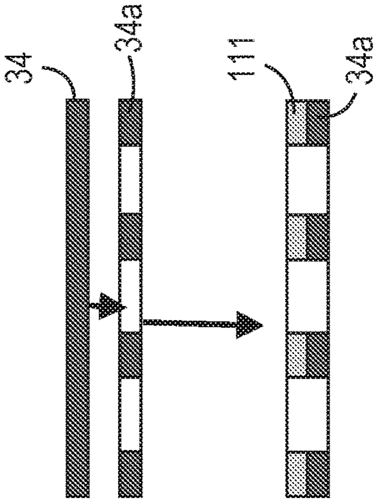
FIG. 3B is a schematic diagram of a process to forming a gasket on a stencil, according to another embodiment of this disclosure.
Figure 3C:
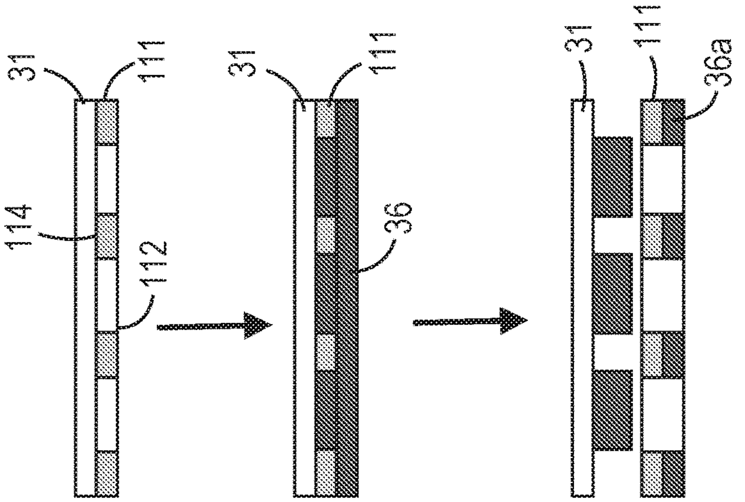
FIG. 3C is a schematic diagram of a process to forming a gasket on a stencil, according to another embodiment of this disclosure.

In some embodiments, a gasket layer can be provided on the stencil shell on the side to be in contact with a substrate. The gasket layer may include a pattern of apertures or openings in registration with the apertures of the stencil shell. In some embodiments, the gasket layer may have a thickness, for example, from about 10 to 500 micrometers. The gasket layer may include at least one of polydimethylsiloxane (PDMS), polyurethane, or photopolymer. FIGS. 3A-3C illustrate various exemplary methods to provide a gasket layer on a stencil shell on the side to be in contact with a substrate.

In some embodiments, a gasket layer can be formed by applying a layer of gasket material on the first major surface of the stencil shell, and laser-ablating the gasket material using the stencil shell as a mask to create a pattern of apertures or openings in registration with the apertures of the stencil shell. In the embodiment depicted in FIG. 3A, a layer 32 of gasket material is provided on the outside 112 of the stencil shell 111 after blocking the holes or apertures 116 from the inside 114. The gasket material can be provided by coating the outside 112 or wrapping a sheet of pre-coated gasket material around the outside 112. A laser 7 is provided to ablate from the inside 114 of the stencil 111 to create a gasket layer 32*a*, using the stencil shell 111 as a mask. In some embodiments, the gasket material 32 can be applied to a layer of stencil material. The laser ablation can be applied to create a pattern of apertures through the layered gasket material and stencil material to form a stencil shell with a gasket layer.

In some embodiments, the gasket layer can be adhered to the first major surface of the stencil shell. In the embodiment depicted in FIG. 3B, a sheet 34 of gasket material is cut to form the same pattern of apertures as the stencil shell 111. Then the gasket 34*a* is adhered onto the stencil 111 shell with the patterns aligned.

In some embodiments, the gasket layer can be formed by applying a removable tape on a second major surface of the stencil shell opposite the first major surface, coating a liquid gasket material on the first major surface of the stencil shell to fill the one or more apertures of the stencil shell, and removing the tape from the stencil shell along with the liquid gasket material in the one or more apertures of the stencil shell to create the pattern of apertures in registration with the apertures of the stencil shell. In the embodiment depicted in FIG. 3C, a tape is applied to block off the inside 114 of the stencil shell 111. A gasket material 36 is coated on the outside 112 of the stencil shell 111. The gasket material 36 is in an undried form, an uncured form, or a liquid form such that the gasket material fills in the apertures of the stencil 111. When the tape 31 is removed from the stencil shell 111, the gasket material in the apertures of the stencil shell 111 is removed along with the tape 31 to form a pattern of apertures in the layer of gasket material 36. A gasket 36*a* is formed on the first major surface of the stencil 111, including the pattern of apertures aligned with the apertures 116 of the stencil 111.

It is to be understood that a gasket layer can be provided on the stencil shell by various methods including, for example, a mechanical means of creating openings, or using a UV developing material that can be selectively cured with a photomask. The gasket layer may have a slightly different pattern or shape than the underlying stencil features.

Referring again to FIG. 1, after the coating material is at least partially cured in the curing zone 142, the first major surface 21 of the substrate 2 is separated from the outer surface 112 of the screen, where a pattern 42 of the at-least-partially-cured coating material is formed on the first major surface 21 of the substrate 2. In the embodiment depicted in FIG. 1, a backing roll 120 is provided to abut the rotary stencil 110 to form a nip 122. The substrate 2 exits the nip 122 and has its second major surface 22 partially wrapping around the backing roll 120. When the substrate 2 exits the nip 122, the first major surface 21 of the substrate 2 is separated from the outer surface 112 of the stencil shell or screen 111 at a separation location C which can be, for example, angularly 10 to 90 degrees downstream from the curing zone 142.

When the substrate 2 is separated from the outer surface 112 of the stencil shell or screen 111, the coating material has been at least partially cured and attached to the first major surface 21 of the substrate 2 such that the coating material is separated from the stencil shell or screen 111 along with the substrate 2. In some embodiments, the stencil shell or screen 111 may include a release material to facilitate the separating of the first major surface 21 of the substrate 2 from the outer surface 112 of the screen. The release material or treatment may also be provided to the side walls of the apertures 116 to facilitate the separating of the at-least-partially-cured coating material from the stencil shell or screen 111. For a relatively thick screen, the one or more apertures of the screen each may have a tapered side wall to facilitate the separating of the at-least-partially-cured coating material from the stencil shell or screen 111.

After the separating of the outer surface 21 of the substrate 2 from the outer surface 112 of the stencil shell or screen 111, the pattern 42 of the coating material on the first major surface 21 of the substrate 2 can be further cured, dried, or solidified by a second curing mechanism 160, if needed. In the embodiment depicted in FIG. 1, the second curing mechanism 160 is positioned downstream of the nip 122 between the stencil 110 and the backing roll 120. The complete curing for the at-least-partially-cured coating material can be accomplished by, for example, exposure of the coating to elevated temperature, or actinic radiation. Actinic radiation can be, for example, in the UV spectrum.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the specification and more particularly the Listing of Exemplary Embodiments and the claims can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

Examples

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Stencil Printing System: Examples and Comparative Examples

The stencil printing coating configuration as illustrated in FIG. 1 was set-up to make Examples. The stencil printing coating configuration as illustrated in FIG. 1' was set-up to make Comparative Examples. The printing was on a Dupont Melanex ST505 film. The ink used was 3M SP-7555 Screen Printable Adhesive, which is UV curable. The squeegee was mounted to the backside of the stencil and was fixed in place by c-clamps. A UV shield was constructed from cardboard and was inserted into the stencil.

Figure 4B:
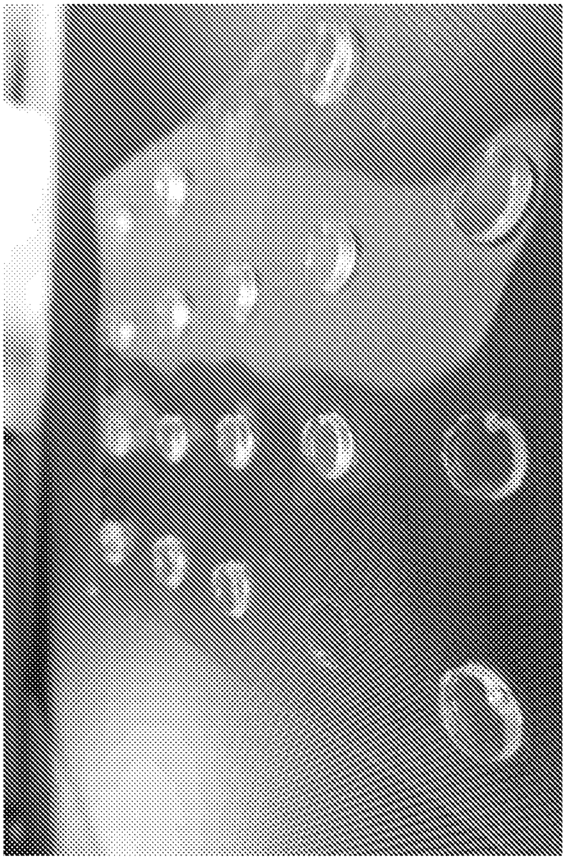
FIG. 4B is an optical image of Example 2 made by a stencil shell with a gasket.
Figure 4A:
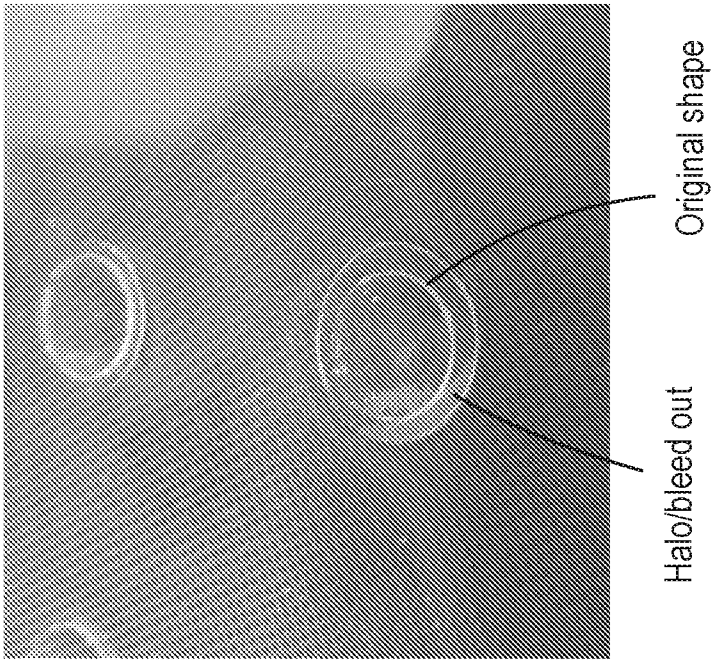
FIG. 4A is an optical image of Example 1 made by a stencil shell without a gasket.

For the Examples, a UV LED unit was situated below the stencil. Using syringes, ink was fed to the system across the length of the squeegee blade. The substrate was unwound, wrapped around the stencil, and then transported to the UV curing unit prior to being rewound. Images of printed features are seen in FIGS. 4A-B.

Figure 5A:
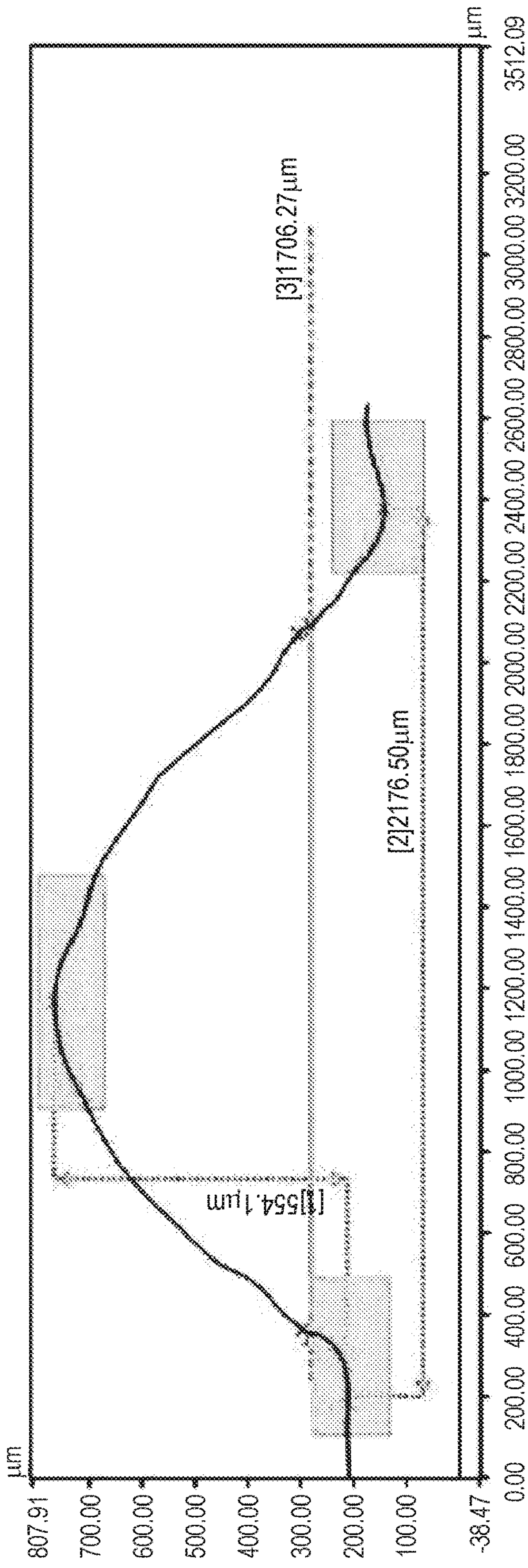
FIG. 5A is an image of Comparative Example.
Figure 5B:
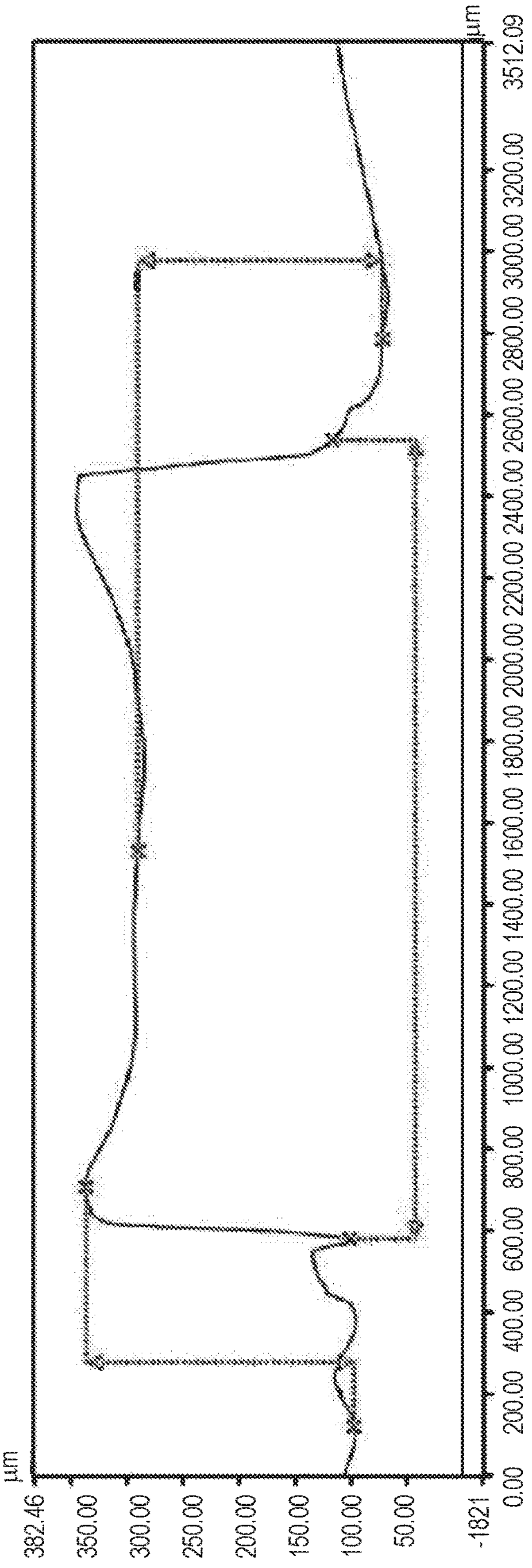
FIG. 5B is an image of Example 1.

After printing, the feature height and topology was measured using a Keyence VHX, as shown in FIGS. 5A-B. FIG. 5A shows the feature height and topology for the Comparative Example, which has a rounded or domed feature profile. FIG. 5B shows the feature height and topology for the Example of FIG. 4B, which has a relatively straight wall and a relatively flat top surface. As shown in FIGS. 5A-B, a significantly flatter feature topology was obtained for the Examples (FIG. 5B) compared to the Comparative Example (FIG. 5A) made by a standard stencil printing process. Depending on ink formulation, the Comparative Example often results in pointed or rounded feature topology.

Stencil with or without Gasket

A piece of nickel stencil made by Sefar Inc. (Buffalo, NY), having a regular array of ¼" holes on a ¾" pitch was laminated on its outside surface to a sheet of 3M Cushion-Mount flexographic mounting Tape (3M, St. Paul, MN) so that a side previously coated with Sylgard 184 Silicone Elastomer (Dow Chemical Company, Midland, MI) was facing outward. This was then taken to a Universal Laser systems VLS6.60 laser (Universal Laser Systems Inc., Scottsdale, AZ) where the outside side of the stencil was placed downward and a pattern of ⅜" squares was roughly aligned to it using the laser cutters software so that all of the holes would be fully hit by the laser. The laser was then made to ablate the ⅜" square pattern so that it fully ablated the tape and elastomer layers. The stencil was then taken to a benchtop and placed on a sheet of PET so that the elastomer material and the PET made intimate contact. This stack was then placed on top of a UV light source and Nazdar OP1028 Premium Gloss UV Flexo Varnish for High-Slip Films (Nazdar Ink Technologies, Shawnee, KS) was bladed across the inside of the stencil into the openings in the stencil. The UV light source was then turned on to sufficiently cure and solidify the printed ink (i.e., such that it felt hard to the touch, and could not be rubbed from the PET surface) to form a stencil including the PET gasket which is in contact with the substrate during printing.

The stencil printing coating configuration as illustrated in FIG. 1 was set-up to make Examples. The Examples printed by the stencil printing system without and with the gasket are illustrated in FIGS. 4A and 4B, respectively. The features in FIG. 4A without the gasket have a halo surrounding the original disk shape, which may be due a bleeding-out of ink along the edge of the aperture in contact with the substrate. The features in FIG. 4B with the gasket have no such "halo" effect.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Various exemplary embodiments have been described. These and other embodiments are within the scope of the following claims.

What is claimed is:

1. A stencil printing system comprising:

a stencil comprising a stencil shell having a first major surface and a second major surface opposite the first major surface, the stencil shell comprising one or more apertures extending from the first major surface to the second major surface, the stencil being a rotary stencil or a flatbed stencil;

a substrate including a major surface in contact with the first major surface of the stencil shell; wherein the stencil shell comprises a release material to facilitate the separating of the major surface of the substrate from the first major surface of the stencil shell;

an applicator disposed adjacent to the second major surface of the stencil shell, configured to dispose a coating material onto the second major surface of the stencil shell to allow at least some of the coating material to fill in the one or more apertures and contact the major surface of the substrate;

a curing mechanism configured to at least partially cure the coating material in contact to the major surface of the substrate at a curing zone where the major surface of the substrate is in contact with the first major surface of the stencil shell;

a shield structure adjacent to the second major surface of the stencil shell and facing the curing zone; and a separation mechanism positioned downstream of the curing mechanism, configured to separate the major surface of the substrate from the first major surface of the stencil shell after the coating material is at least partially cured by the curing mechanism, wherein a pattern of the coating material that is at least partially cured is formed on the major surface of the substrate.

2. A method of applying a pattern to a substrate, the method comprising:

providing the stencil printing system of claim 1;

contacting the major surface of the substrate with the first major surface of the stencil shell;

disposing a coating material onto the second major surface of the stencil shell to allow at least some of the coating material to fill in the one or more apertures and contact the major surface of the substrate;

at least partially curing the coating material in contact to the major surface of the substrate at the curing zone where the major surface of the substrate is in contact with the first major surface of the stencil shell; and after at least partially curing the coating material, separating the major surface of the substrate from the first major surface of the stencil shell, wherein a pattern of the coating material that is at least partially cured is formed on the major surface of the substrate.

3. The method of claim 2, wherein contacting the major surface of the substrate with the first major surface of the stencil comprises at least partially wrapping the substrate around the rotary stencil.

4. The method of claim 2, further comprises forcing, via the applicator positioned adjacent to the second major surface of the stencil shell, the coating material to flow through the one or more apertures of the stencil shell, wherein a coating bead of the coating material is formed upstream of the applicator and in contact with the second major surface of the stencil shell.

5. The method of claim 2, wherein the stencil printing system further comprises a backing roll to abut the rotary stencil to form a nip, and wherein the major surface of the substrate is separated from the first major surface of the stencil shell when the substrate exits the nip.

6. The method of claim 2, wherein the stencil printing system further comprises a second curing system, and the method further comprises further curing the pattern of the coating material after the separating of the major surface of the substrate from the first major surface of the stencil shell.

7. The stencil printing system of claim 1, wherein the applicator is configured to force the coating material to flow through the one or more apertures of the stencil shell to form a coating bead of the coating material upstream of the applicator and in contact with the second major surface of the stencil shell.

8. The stencil printing system of claim 1, wherein the separation mechanism comprises a backing roll to abut the rotary stencil to form a nip.

9. The stencil printing system of claim 1, further comprising a second curing mechanism to cure the pattern of the coating material that is at least partially cured after the separating of the major surface of the substrate from the first major surface of the stencil shell.

10. The stencil printing system of claim 1, wherein the one or more apertures of the stencil shell have a thickness of 50 micrometers to 1.0 mm.

11. The stencil printing system of claim 1, wherein the one or more apertures of the stencil shell have a lateral dimension of 100 micrometers to 5.0 mm.

12. A stencil printing system comprising:

a stencil comprising a stencil shell having a first major surface and a second major surface opposite the first major surface, the stencil shell comprising one or more apertures extending from the first major surface to the second major surface, the stencil being a rotary stencil or a flatbed stencil;

a gasket layer on the first major surface of the stencil shell, wherein the gasket layer comprises a pattern of apertures in registration with the one or more apertures of the stencil shell;

a substrate including a major surface in contact with the gasket layer;

an applicator disposed adjacent to the second major surface of the stencil shell, configured to dispose a coating material onto the second major surface of the stencil shell to allow at least some of the coating material to fill in the one or more apertures of the stencil shell and the one or more apertures of the gasket layer and contact the major surface of the substrate;

a curing mechanism configured to at least partially cure the coating material in contact to the major surface of the substrate at a curing zone where the major surface of the substrate is in contact with the first major surface of the stencil shell;

a shield structure adjacent to the second major surface of the stencil shell and facing the curing zone; and a separation mechanism positioned downstream of the curing mechanism, configured to separate the major surface of the substrate from the first major surface of the stencil shell after the coating material is at least partially cured by the curing mechanism, wherein a pattern of the coating material that is at least partially cured is formed on the major surface of the substrate.

13. The stencil printing system of claim 12, wherein the gasket layer has a thickness from 10 to 500 micrometers.

14. The stencil printing system of claim 12, wherein the gasket layer comprises at least one of polydimethylsiloxane (PDMS), polyurethane, or photopolymer.

* * * * *